T. B. SAULT.
LATHE TOOL.
APPLICATION FILED SEPT. 11, 1915.
1,269,315.
Patented June 11, 1918.
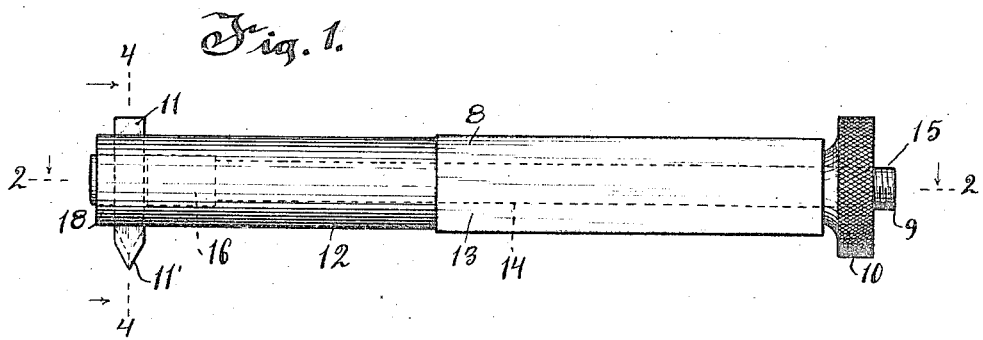
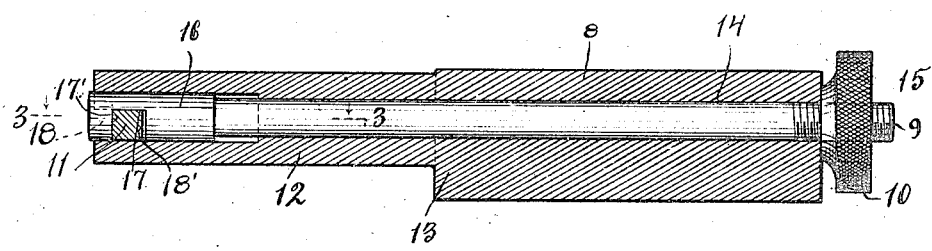
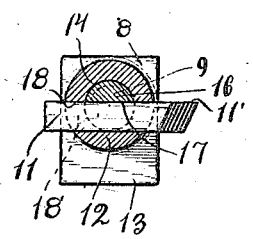
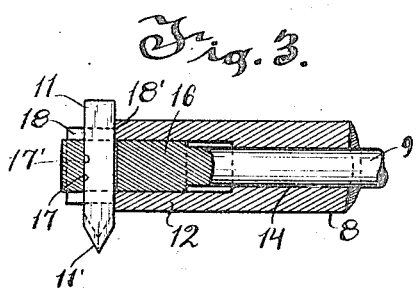
INVENTOR
Thomas B. Sault.
By Morsell, Keeney & French,
ATTORNEYS

UNITED STATES PATENT OFFICE.

THOMAS B. SAULT, OF MILWAUKEE, WISCONSIN, ASSIGNOR OF ONE-HALF TO GEORGE S. MEREDITH, OF MILWAUKEE, WISCONSIN.

LATHE-TOOL.

1,269,315.  Specification of Letters Patent.  Patented June 11, 1918.

Application filed September 11, 1915. Serial No. 50,147.

*To all whom it may concern:*

Be it known that I, THOMAS B. SAULT, a citizen of the United States, and resident of Milwaukee, in the county of Milwaukee and State of Wisconsin, have invented new and useful Improvements in Lathe-Tools, of which the following is a description, reference being had to the accompanying drawings, which are a part of this specification.

This invention relates to improvements in lathe tools.

In ordinary machine shop practice lathe tools are usually forged from bars of steel and the tools for cutting threads or tubular stock have the cutting portion bent at right angles to the body portion and if during the cutting operation the tool becomes dull it is removed for resharpening and in replacing the tool it is necessary to readjust the tool with reference to the work. This operation requires considerable time and at times it is very difficult to readjust the tool with relation to some kinds of work. The tool also has to be reforged from time to time to compensate for the wear of the bent portion.

It is one of the objects of the present invention to overcome the before mentioned objectionable features and provide a lathe tool adapted for use in the ordinary lathe and in which the cutting portion of the tool may be easily removed for sharpening without changing the adjustment of the body portion of the tool.

A further object of the invention is to provide a lathe tool in which the cutting portion of the tool may be easily adjusted toward or away from the side portion of the tool.

A further object of the invention is to provide a lathe tool which is of simple construction, is strong and durable and is well adapted for the purpose described.

With the above and other objects in view the invention consists of the improved lathe tool and its parts and combinations as set forth in the claims, and all equivalents thereof.

In the accompanying drawing in which the same reference characters indicate the same parts in all of the views:

Figure 1 is a top view of the improved lathe tool;

Fig. 2 is a longitudinal sectional view thereof taken on line 2—2 of Fig. 1;

Fig. 3 is a sectional detail view taken on line 3—3 of Fig. 2; and

Fig. 4 is a transverse sectional view taken on line 4—4 of Fig. 1.

Referring to the drawing the numeral 8 indicates the sleeve portion or shank, 9 the clamping bolt, 10 the clamping thumb nut and 11 the transversely extending cutter member of the improved lathe tool. The sleeve or shank portion is formed of a bar of metal of rectangular form in cross section and having its forward end portion turned to divide the sleeve into a cutter holding portion 12 which is round in cross section, and a lathe attaching portion 13 which is of rectangular shape in cross section. The attaching portion 13 projects downwardly below the plane of the cutter holding portion so that the thumb nut will clear the portion of the lathe upon which the attaching portion rests. The body portion is drilled longitudinally of its length to form a bore 14 to receive the clamping bolt 9. The said bolt 9 is threaded on its inner end 15 to receive the thumb nut 10 and the outer end is preferably, although not necessarily, enlarged to form a head 16, the bore being correspondingly enlarged to receive said head. A lower side of the head near its outer end is provided with a rectangular transverse groove 17 which is in alinement with a rectangular transverse groove 18 formed in the outer end of the cutter holding portion of the body. The two grooves 17 and 18 form a transversely extending opening which is of rectangular form in cross section to receive the cutting member 11 of the tool and the upper portion of the groove is approximately in horizontal alinement with the axis of the bore of the sleeve to properly position the cutting edge of the tool. This cutter member is formed of a short piece of tool steel of rectangular form in cross section and of a size to easily fit the transverse opening. The cutting end 11' of the cutter member is sharpened as desired to fit the particular class of work to be done.

In tightening up on the thumb nut the tool will be securely clamped between the shoulders 17' and 18' of the bolt and sleeve portions of the tool.

In use the lathe tool is mounted in the tool post of the lathe and used in the ordinary manner and in the event that it is necessary to sharpen the tool it is only necessary to loosen the clamping screw and withdraw the cutting member without changing the adjustment of the tool proper. After the member has been sharpened it may be easily replaced with its cutting edge against the work in the exact position it formerly was in without requiring accurate adjustment. It will also be noted that the cutting member may be used until worn down to a length just sufficient to permit its being held in the sleeve thus providing a very efficient tool and when worn out may be replaced with new cutting members at a minimum cost.

What I claim as my invention is:

1. A lathe tool, comprising a sleeve member provided with a transverse groove at one end portion, one face of the grooved portion being approximately in axial alinement with the bore of the sleeve, a clamping member extending through the bore of the sleeve and having a groove in one side portion adjacent to the groove of the sleeve and in alinement therewith, a cutter member extending through the grooves and projecting from one side of the sleeve member, the grooved portions holding the cutting face of the cutter member approximately in axial alinement with the bore of the sleeve, and means engaging the sleeve and the clamping member for clamping the cutter member between the sleeve and clamping members.

2. A lathe tool, comprising a sleeve member provided with a transverse groove at one end portion, one bore of the grooved portion being approximately in axial alinement with the bore of the sleeve, a threaded rod extending through the bore of the sleeve and having a groove in one side portion adjacent to the groove of the sleeve and in alinement therewith, the threaded portion of the rod projecting from one end of the sleeve, a cutter member extending transversely through the grooves and projecting from one side of the sleeve member, the grooved portions holding the cutting face of the cutter member approximately in axial alinement with the bore of the sleeve, and a nut threaded on the projecting rod for clamping the cutter member between the sleeve member and the rod.

3. A lathe tool comprising a sleeve member provided with a transverse groove at one end portion of rectangular shape in cross section, a threaded rod extending through the bore of the sleeve member and having a groove in one side portion adjacent to the groove of the sleeve, said rod groove being of rectangular shape in cross section and the threaded portion of the rod projecting from one end of the sleeve member, a cutting member of rectangular form in cross section extending through said grooves and projecting from one side of the sleeve member, the grooved portions holding the cutting face of the cutter member approximately in axial alinement with the bore of the sleeve, and a nut threaded on the projecting portion of the rod for clamping the cutting member between the sleeve member and the rod.

In testimony whereof, I affix my signature.

THOMAS B. SAULT.